US008234199B2

(12) United States Patent
Mistretta (10) Patent No.: US 8,234,199 B2
(45) Date of Patent: Jul. 31, 2012

(54) SYNTHETIC FIXED INCOME PRINCIPAL PROTECTED VEHICLE AND METHODOLOGY

(76) Inventor: Mark J. Mistretta, New Milford, MA (US)

( * ) Notice: Subject to any disclaimer, the term of this patent is extended or adjusted under 35 U.S.C. 154(b) by 2095 days.

(21) Appl. No.: 10/117,431

(22) Filed: Apr. 5, 2002

(65) Prior Publication Data
US 2002/0174046 A1 Nov. 21, 2002

Related U.S. Application Data

(60) Provisional application No. 60/281,953, filed on Apr. 6, 2001.

(51) Int. Cl.
*G06Q 40/00* (2012.01)
(52) U.S. Cl. .......................... 705/36 R; 705/35
(58) Field of Classification Search .............. 705/35
See application file for complete search history.

(56) References Cited

U.S. PATENT DOCUMENTS

| | | | | |
|---|---|---|---|---|
| 4,334,270 A | * | 6/1982 | Towers | 705/36 R |
| 4,722,055 A | | 1/1988 | Roberts | 365/408 |
| 4,739,478 A | | 4/1988 | Roberts et al. | 365/408 |
| 4,742,457 A | | 5/1988 | Leon et al. | 364/408 |
| 4,752,877 A | | 6/1988 | Roberts et al. | 364/408 |
| 5,126,936 A | * | 6/1992 | Champion et al. | 705/36 R |
| 5,202,827 A | | 4/1993 | Sober | 364/408 |
| 5,592,379 A | * | 1/1997 | Finfrock et al. | 705/36 |
| 5,689,549 A | | 11/1997 | Bertocci et al. | 379/61 |
| 5,774,880 A | | 6/1998 | Ginsberg | 705/36 |
| 5,806,047 A | * | 9/1998 | Hackel et al. | 705/36 R |
| 5,812,987 A | | 9/1998 | Luskin et al. | 705/36 |
| 5,832,461 A | | 11/1998 | Leon et al. | 705/38 |
| 5,933,815 A | | 8/1999 | Golden | 705/35 |
| 5,950,175 A | | 9/1999 | Austin | 705/35 |
| 5,987,436 A | | 11/1999 | Halbrook | 705/38 |
| 6,021,397 A | | 2/2000 | Jones et al. | 705/36 |
| 6,052,673 A | | 4/2000 | Leon et al. | 705/38 |
| 6,064,985 A | | 5/2000 | Anderson | 705/36 |
| 6,092,056 A | | 7/2000 | Tull, Jr. et al. | 705/36 |
| 6,108,641 A | | 8/2000 | Kenna et al. | 705/35 |
| 6,125,355 A | | 9/2000 | Bekaert et al. | 705/36 |
| 6,269,346 B1 | | 7/2001 | Cristofich et al. | 705/37 |
| 6,360,210 B1 | | 3/2002 | Wallman | |

OTHER PUBLICATIONS

David L. Scott, Wall Street Words, 2003, Published by Houghton Mifflin Company.*
IEEE Transactions on Information Theory, vol. IT-30,No. 2 , Mar. 1984, An Algorithm for Maximizing Expected Log Investment Return, Thomas M. Cover, Fellow, IEEE.*

(Continued)

*Primary Examiner* — Hani M Kazimi
*Assistant Examiner* — Chuks Onyezia
(74) *Attorney, Agent, or Firm* — Wolf, Greenfield & Sacks, P.C.

(57) ABSTRACT

Methods and systems are provided for structuring and investing in a single investment vehicle that combines a guarantee of a predetermined percentage of principal along with a potential for returns historically associated with high risk equity investments. Methods and systems of the invention are useful for allocating investments to provide potentially high yields while preserving a guaranteed amount of principal over a predetermined investment period. Methods of the invention are also useful for providing institutional investors with a return driven investment vehicle that also provides access to principal during an investment period in order to meet pre-existing or continuing financial obligations.

8 Claims, 8 Drawing Sheets

OTHER PUBLICATIONS

Insurance: Mathematics and Economics 25 (1999) 307-325, Pricing rate of return guarantees in a Heath—Jarrow—Morton framework q,Kristian R. Miltersen and Svein-Arne Persson b,a Department of Management, Odense University, Campusvej 55, DK-5230 Odense M, Denmark, Institute of Finance and Management Science, The Norwegian School of Economics.*

Fair Valuation of a Guaranteed Life Insurance Participating Contract Embedding a SurrenderOptionAuthor(s): Anna Rita Bacinello Reviewed work(s):Source: The Journal of Risk and Insurance, vol. 70, No. 3 (Sep. 2003), pp. 461-487.*

Pilgrim Principal Protection Fund Prospectus (Jul. 3, 2001).

Pilgrim Principal Protection Fund II Prospectus (Nov. 5, 2001).

Pilgrim Principal Protection Fund II Investor Guide (Offering Phase: Nov. 5, 2001 to Jan. 31, 2002).

Chandler, "Guranteed Funds: It Seemed a Good Idea," *International Herald Tribune*, (Dec. 19, 1992).

* cited by examiner

StoneBridge PLT Fund I

Investment Structure and Financial Model

| Fund Offering | $ 2,000,000,000 | | GIC Costs Without and With Coupon | | |
|---|---|---|---|---|---|
| A Shares | 40.0% | | GIC without Coupon | $ | 421,803,864 |
| B Shares | 60.0% | | GIC with Coupon | $ | 773,786,805 |
| General Assumptions | | | Funds Allocated for Investment | $ | 773,409,331 |
| Preferred Return to A Shares | 10.00% | | Real Estate | $ | 154,681,866 |
| Preferred Return to B Shares | 8.00% | | Private Equity | $ | 363,502,386 |
| Marketing costs (one time) | 1.25% | | Venture | $ | 255,225,079 |
| Annual management fee | 2.00% | | Annual Management Fee | $ | 40,000,000 |
| Profit participation - A Shares | 10.00% | | Marketing Cost | $ | 25,000,000 |
| Profit participation - B Shares | 15.00% | | Investment Allocation A shares | | 47.02% |
| Average yield on invested cash | 5.00% | | Investment Allocation B shares | | 52.98% |
| Interest rate on the GIC w/o coupon | 6.61% | | Total | | 100.00% |
| Interest rate on the GIC with coupon | 6.49% | | Liquidity Contribution from Fund | | 0.00% |
| Real Estate Allocation | 20% | | Coupon Contribution (GIC) | | 6.00% |
| Real Estate | | | Total Coupon - B Shareholders | | 6.00% |
| Loan origination fees | 1.00% | | Total Coupon Payments - B Shareholders | $ | 72,000,000 |
| Appreciation | 4.50% | | Total A Share Returns | $ | 2,352,863,923 |
| Interest on Real Estate Loans | 7.00% | | IRR | | 12.7% |
| % Allocated to Equity | 25.00% | | Total B Share Returns | $ | 2,132,797,393 |
| Target Rate of Return | 13.31% | | IRR | | 11.8% |
| Private Equity Allocation | 47% | | | | |
| Private Equity | | | | | |
| Private Equity Interest | 8.00% | | | | |
| Private Equity Transaction Fees | 1.00% | | | | |
| Target Rate of Return | 25.00% | | | | |
| % Allocated to Equity | 80.00% | | | | |
| Venture Allocation | 33% | | | | |
| Venture Allocation | | | | | |
| Target Rate of Return | 30.00% | | | | |
| Transaction fees | 0.00% | | | | |
| Average time for Mezzanine financing (yrs) | 3 | | | | |
| Average time for Equity investment (yrs) | 5 | | | | |
| Total of Fund Allocation | 100% | | | | |

Figure 6

SYNTHETIC FIXED INCOME PRINCIPAL PROTECTED VEHICLE AND METHODOLOGY

RELATED APPLICATIONS

This application claims priority to, and the benefit of U.S. Ser. No. 60/281,953 filed Apr. 6, 2001, the disclosure of which is incorporated by reference herein in its entirety.

FIELD OF THE INVENTION

The invention relates generally to methods and systems for managing investments in order to generate targeted returns while minimizing risks to investment principal. In particular, the invention relates to methods and systems for providing a single financial vehicle that guarantees the return of a predetermined amount of investment principal while also offering the potential of targeted returns over a predetermined investment period.

BACKGROUND

In order to manage investment risks, an investor typically attempts to build a diversified portfolio that includes a blend of low risk investments having low yields, and high risk investments having higher potential yields. However, this approach does not provide an investor with an easy solution for balancing long term goals for investment growth with short or intermediate term needs for access to invested funds.

This issue is of particular importance to large institutional investors such as pension fund trustees. Pension fund trustees have a fiduciary responsibility to invest monies contributed to the fund so as to generate sufficient returns while meeting pension obligations to retirees. Fund trustees also have an overriding responsibility to preserve the principal of employees' investments. This responsibility can expose fund trustees and fiduciaries to personal liability for imprudent management of fund assets.

Typically, pension funds manage their investments toward an established actuarial return, which represents the return necessary to meet the payout obligations of each plan over time. During the past several years there has been significant growth in the dollar values of pension fund portfolios. These gains are principally attributed to earlier changes in regulation and, more dramatically, to the numbers of people participating in retirement plans as well as the economic boom of the past decade. Therefore, there is a growing need for investment strategies that provide long-term growth along with manageable security of principal.

Over the last several years, many fund managers have increased their asset allocation in public equities in an effort to garner increased yields. Increased equity price expectations, combined with the absence of inflation and a low interest rate environment, helped fuel rising public and private equity markets during this period. However, this strategy did not work well after the second quarter of the year 2000.

A substantial decline of the equity markets after the second quarter of 2000 compelled most fund managers to reevaluate their respective asset allocations. While inflation has not been a threatening factor, the continuing lower interest rate environment, coupled with the likelihood of further rate declines, have left few opportunities to obtain yields in the public and private equity markets that would make up for losses incurred to this point. There is therefore a need in the art for investment methods and systems that enable fiduciaries to meet their underlying responsibility for preserving principal while obtaining higher targeted yields historically associated with equity investments throughout a multi-year span of an investment period.

SUMMARY

The invention provides methods and products that combine, in a single investment vehicle, a principal preservation component and a managed investment component. According to the invention, an investment amount is provided to a single investment vehicle where it is allocated into multiple, preferably two, general investment pools for a predetermined investment period. In a first pool, a portion of the principal amount is invested to regenerate the total invested principal, or a predetermined portion or multiple thereof, over the investment period. In a second pool, the managed investment pool, the remaining portion of the principal amount is invested and managed over the investment period to generate the higher returns historically associated with equity investments. Methods of the invention are useful for providing a blended return on an investment, where a low risk profile is blended with a potential for a high return in a single investment vehicle. The nature of this single vehicle enables investors to further enhance their yields beyond those available from traditional asset allocation programs.

The invention is useful to provide investors with a unique and innovative investment product, developed to meet a critical need in the financial marketplace. The invention provides a relatively safe investment vehicle with a guarantee of principal, or a percentage thereof, plus the potential for upside returns from equity participation. In addition, products and methods of the invention may be provided to the investment community at large, including but not limited to retail investors, endowments, trusts, foundations, directed funds from insurance companies, and other funds.

Accordingly, in one aspect, the invention provides methods and systems for structuring an investment vehicle by allocating an investment principal within a single investment vehicle. According to the invention, a portion of the investment is allocated into a guaranteed component of the investment vehicle based, in part, on the goals of the investor, and on the rates of available guarantee instruments at the time of the investment. Preferred guarantee instruments include A rated securities, or above, mortgage backed securities, corporate bonds, municipal bonds, U.S. Treasury bonds or notes, indices tied to U.S. bonds and notes, GNMAs, FNMAs, Guaranteed Insurance Contracts of 3 to 15 years, collateralized mortgage obligations, LIBOR-based investments of 5 to 15 year maturity, financial guarantee insurance, funding agreements, annuity contracts, zero-coupon bonds, and foreign equivalents thereof. Once the allocation to the guaranteed component is made, the remaining portion of the investment is allocated to a managed investment pool or component of the investment vehicle. Preferred managed investments include investments in private companies, private equity, real estate, venture capital, and publicly traded securities, and in biotechnology, pharmaceutical, energy, telecommunications, and medical device sectors.

In another aspect, the invention provides a single investment vehicle for guaranteeing a return of principal, or a predetermined fraction or multiple thereof, while preserving the possibility of high yields from a growth-oriented investment strategy. According to a preferred vehicle of the invention, investors benefit from a guarantee of invested principal, optional tailor-made periodic cash payments that are each equal to a percentage of the total invested amount, and an opportunity for higher equity-like returns. In preferred aspects of the invention, the managed investment pool is invested in three distinct high performance market segments with minimum correlation, and minimal exposure to the volatility of public markets. This investment vehicle has the potential to provide high returns through strategically chosen, minimally correlated investing, wherein the preferred vehicle utilizes both debt and equity investing in real estate, middle-market private companies, and venture investing. This investment vehicle minimizes the risk of principal loss over the life of the vehicle while creating the opportunity to realize meaningful gains. In preferred embodiments, this is accomplished by combining the security of an investment agreement that provides (1) an A-rated or better, insurance-backed guarantee of principal with (2) a carefully structured, secured equity investment and lending strategy that provides the opportunity for significant returns in a risk controlled environment.

In a further aspect, the invention provides methods and systems for structuring a single investment vehicle that offers a guaranteed return of a predetermined amount of an investment principal over the life of the vehicle and includes a growth-oriented investment component.

In another aspect, methods of the invention can be practiced on a computer system that implements an algorithm or method according to the invention, or that implements at least a portion of an algorithm or method according to the invention. Accordingly, the invention includes methods for allocating principal, structuring investment vehicles, and optimizing yields, that are performed at least partially by a programmed computer.

BRIEF DESCRIPTION OF THE DRAWINGS

FIG. 5 shows a flowchart of a managed investment pool of the invention.

FIG. 6 shows a typical report generated by a computer system of the invention.

DETAILED DESCRIPTION

The present invention provides methods for allocating investments over a predetermined investment period to guarantee return of principal, or a predetermined fraction or multiple thereof, while preserving the possibility of higher yields historically associated with equity investments through managed investments. Methods and products of the present invention provide single investment vehicles that combine principal preservation with long term growth potential. Methods of the invention are particularly useful for institutional investors in order to meet short-term financial obligations while also seeking long-term investment growth.

A. Investment Allocation Within a Single Financial Vehicle

As described in greater detail below, methods and products of the invention rely, in part, upon the following key features:
a single investment vehicle;
a predetermined investment period;
an up-front agreement to allocate a portion of the invested funds to regenerate the invested principal, or a multiple or fraction thereof by maturity;
an up-front agreement to allocate a portion of the invested funds to a managed investment program; and
optionally, an agreement to provide for periodic cash payments.

Figure 1:
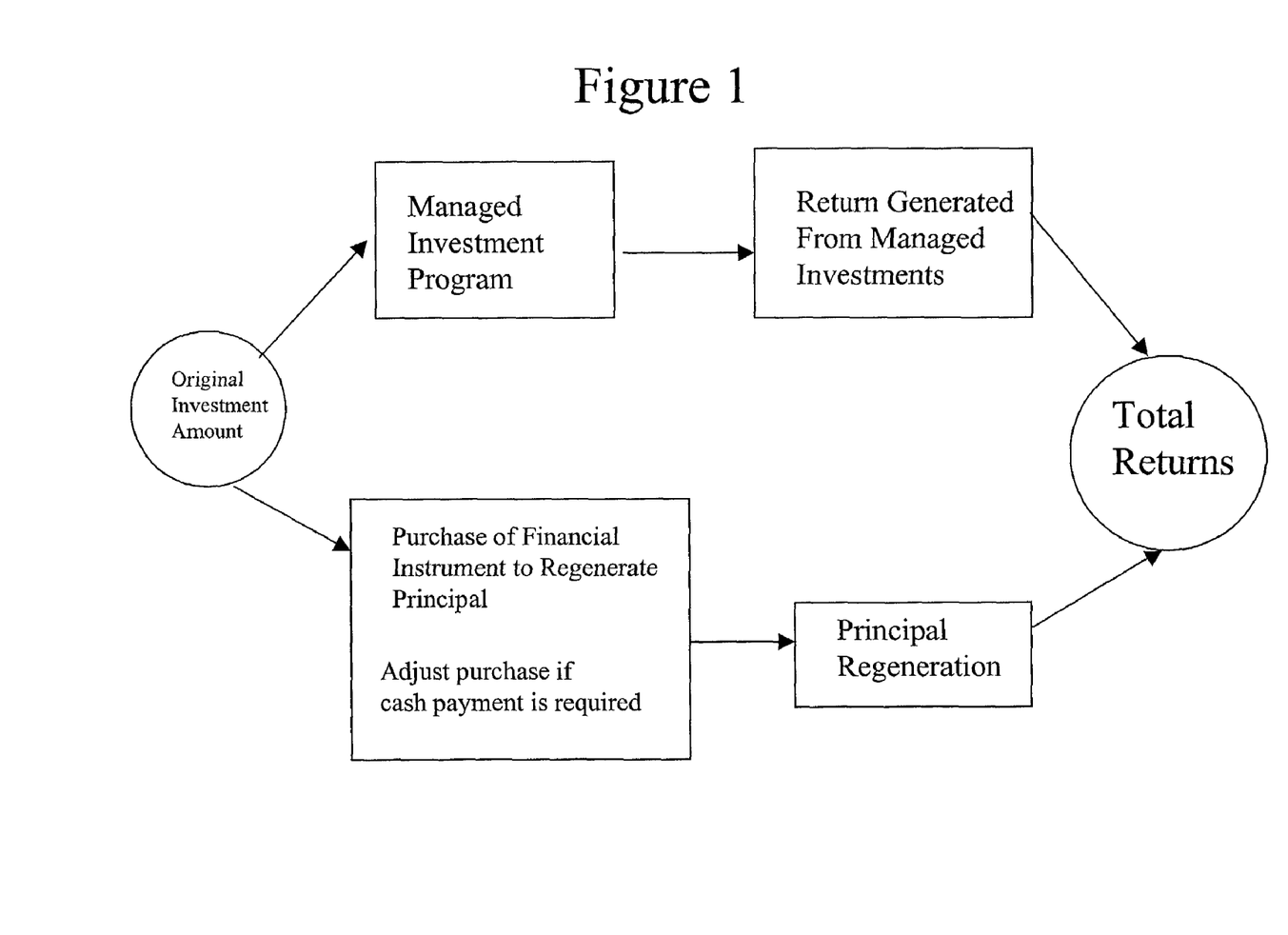
FIG. 1 shows an outline of an investment method according to the invention.
Figure 2:
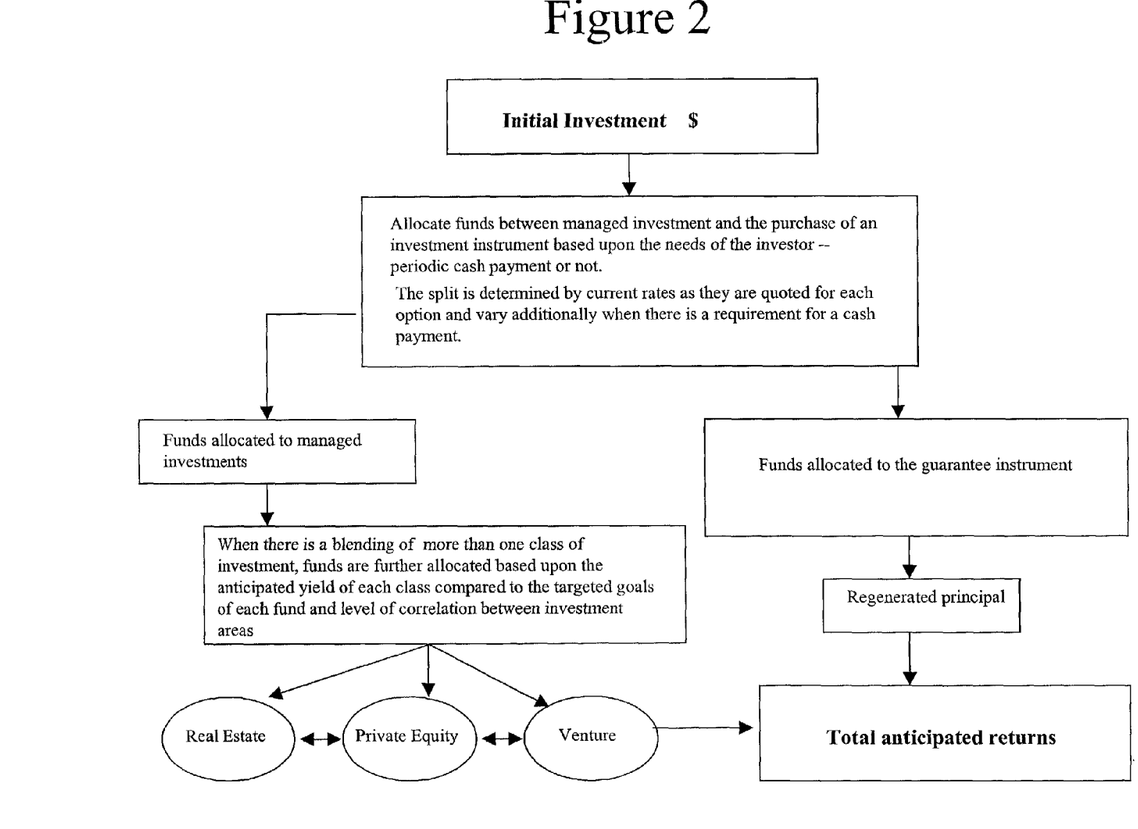
FIG. 2 shows the structure of an investment vehicle according to the invention (AAA, AA, A, BBB, BB, and B refer to ratings; RE is Real Estate; PE is Private Equity; and VC is Venture Capital).

FIG. 1 shows a method of the invention according to which an investment is provided to a single investment vehicle or fund. A portion of the investment is then allocated to a guaranteed component of the vehicle, and a portion of the investment is allocated to a managed investment component. For example, when an investor places funds in a single-financial vehicle of the invention, a portion of the monies, for example a percentage in the range of 40%-55%, is used to provide a guarantee of principal. The balance, for example in the range of 60%-45%, is invested in a variety of carefully selected investments in areas such as real estate, private equity, and venture capital. FIG. 2 shows an example of a financial vehicle of the invention that includes a guaranteed component and a managed investment component. The ultimate yield, or final realized internal rate of return (IRR), of the investment vehicle includes the guaranteed amount plus the yield from the managed investment component.

i. A Single Investment Vehicle

A single financial vehicle of the invention provides investors with an opportunity to participate in potentially higher yielding equity investments without the risk of losing their principal. In one embodiment, a single financial vehicle may include a principal guarantee that is indexed for inflation. Alternatively, a single financial vehicle may contain a guarantee of principal that is less than 100% should an investor wish to sacrifice guarantee of a portion of principal for the potential of higher yields. In a further embodiment, a single financial vehicle of the invention may contain a guarantee of principal that is greater than 100% should an investor wish to sacrifice the potential of higher yields in favor of the guarantee.

Figure 3:
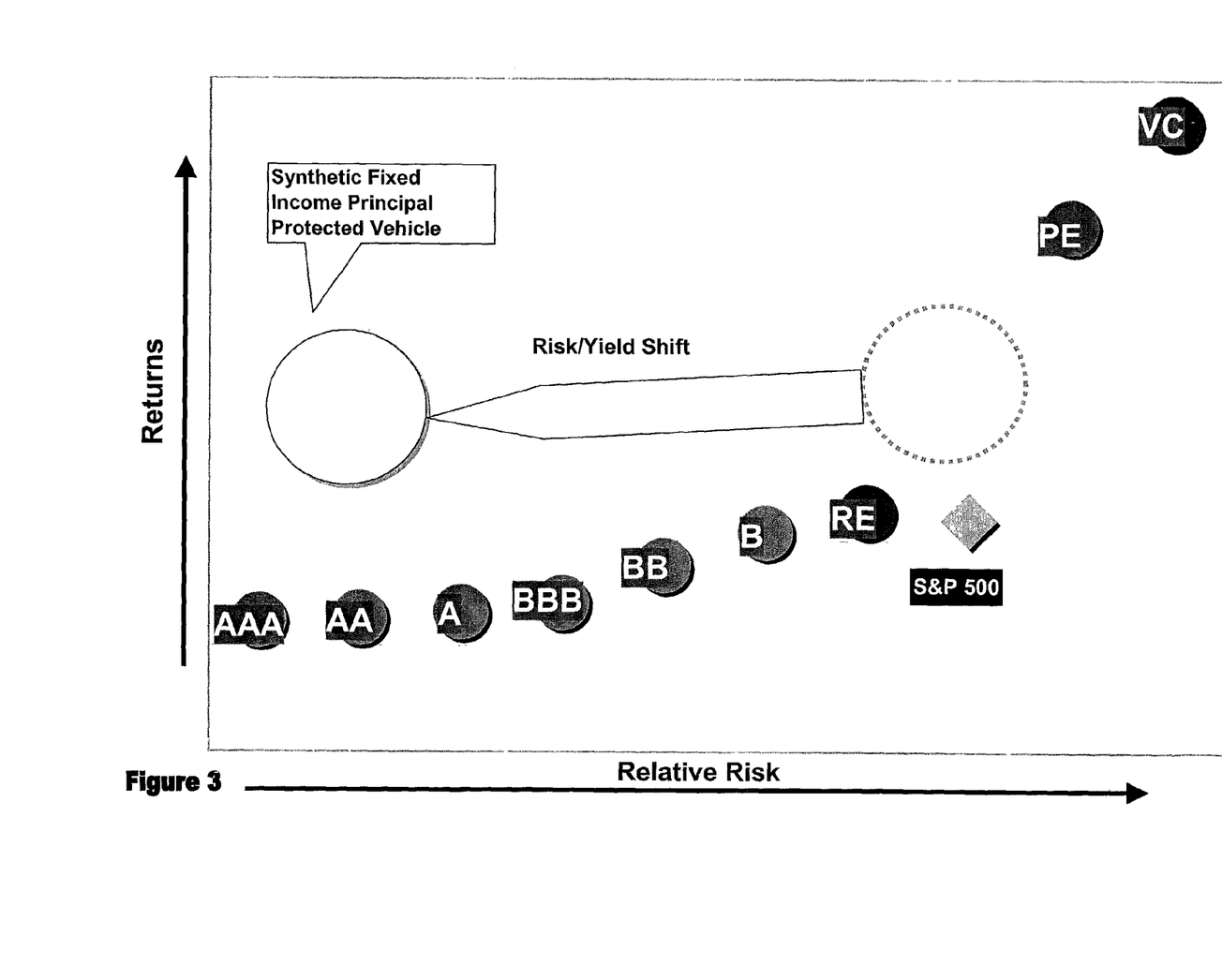
FIG. 3 shows the shifted risk/yield profile of an investment vehicle according to the invention.

According to the invention, a single investment vehicle that combines a minimum guarantee of principal with a significant upside potential for high returns offers potential investors a blended profile of risk and return. This is illustrated in FIG. 3 which shows the risk/yield profile of an investment vehicle of the invention, and contrasts it with typical profiles of alternative investments. The invention provides a single vehicle that blends the low risk characteristics of investment-grade securities (shown in the lower left of FIG. 3) with the high yield opportunities of private equity and venture capital (shown in the upper right of FIG. 3). Accordingly, as shown in FIG. 3, the invention provides a synthetic financial vehicle with a risk/yield profile that is not currently available. Currently available vehicles do not provide this profile in a single consolidated investment opportunity. By creating a single product for investors to purchase, the risk normally associated with high yield investments is reduced by including financial instruments that guarantee a predetermined amount of the principal invested, resulting in a secure blended return. The combination of high yield investments with a dominating low risk regeneration of principal in a single investment dynamically changes the characteristics of risk versus reward. Accordingly, a single vehicle of the invention provides a new blend of returns and relative risk that enables investors to further enhance their yields beyond the traditional asset allocation models.

An investment vehicle of the invention includes an agreement to allocate a portion of an investment principal (the guarantee allocation or guarantee component) to regenerate the invested principal, or a fraction or multiple thereof, over a predetermined investment period. According to the invention, the remaining portion of the investment (the active or managed allocation or component) is allocated to a managed investment pool. In a preferred investment vehicle of the invention, the managed investment pool combines the active investment allocations of a plurality of investors. In contrast, for each investor, the guarantee component typically is based on a separate guarantee instrument, and generally is not pooled with the guarantee components of other investors.

ii. A Predetermined Investment Period

According to the invention, an investment period is a predetermined period that starts when an investment is provided (e.g. when an investment is funded and closed) to a vehicle of the invention and ends when all of the investment proceeds are paid out from the vehicle. Preferred investment periods range from 5 to 20 years, and more preferably from 7 to 12 years. The investment proceeds include the guaranteed amount and the yield from the managed investment pool.

A typical investment vehicle or fund of the invention includes a marketing period and a managed-investment period. During the marketing period, investors commit investments to the fund. Preferred marketing periods range from 3 months to 2 years. Typical marketing periods range from 12 to 18 months. According to the invention, an allocation or investment agreement is put in place for each investor during the marketing period. Each agreement determines the investor's allocations to the guaranteed and managed components of the fund. A typical agreement includes a defined investment period, a chosen guarantee instrument, a chosen percentage return of principal, and an operating agreement relating to the management of the investment vehicle. The agreement may also specify a chosen periodic cash payment for the investor. In addition, the agreement may provide for the investment period to be extended, for example for up to two years, at the discretion of management. The agreement may further provide for one or more extensions to the investment period, for example beyond an additional two years, upon approval by the majority of shareholders. At the end of the marketing period, the investment vehicle closes and the funds allocated to the managed investment pool are invested for a predetermined managed-investment period. Funds provided during the marketing period may be invested during the marketing period, prior to the investment vehicle closing, as described herein. However, after the investment vehicle closes, all funds allocated to the managed investment component of the vehicle are pooled and invested pursuant to the operating agreement. At the end of the managed-investment period, the managed-investment pool is liquidated and the managed investments, including any profit or loss, are apportioned to the investors in the fund, less fees as described herein.

The guaranteed component of the investment is returned to an investor at the end of a predetermined guarantee period. This guarantee period may start during the marketing period, when an investment is provided. Alternatively, the allocation agreement may provide a future date on which the guarantee period starts. For example, the guarantee period may start when the fund closes. Alternatively, the guarantee may start a predetermined time after an investment is committed to a fund, or a predetermined time after the fund closes. Therefore, an investment period includes a portion of the marketing period, the managed-investment period, and any portion of the guarantee period that extends beyond the managed-investment period. In preferred embodiments of the invention, the guarantee and managed-investment periods are chosen to have similar durations. According to the invention, an investment period is chosen based, in part, upon the performance characteristics sought by investors, and is a function of current market conditions. For example, a longer investment period may be required if the guarantee is for a greater multiple of principal. Preferred investment periods are between 5 and 20 years.

iii. An Up-front Agreement to Allocate a Portion of Funds to a Fixed Investment that Guarantees a Predetermined Return According to the invention, a portion of an invested principal is allocated to regenerate a predetermined multiple or fraction of the principal over the investment period. This allocation is pursuant to an up-front investment or allocation agreement, which provides for return of principal through a combination of periodic cash payments, if selected, and repayment at maturity. According to the invention, the guarantee of a predetermined multiple or fraction of principal is supported by an investment that forms the basis for the principal regeneration The guarantee can be accomplished in one of several ways. In a preferred embodiment, principal is regenerated by purchasing a Guaranteed Investment Contract ("GIC") or other funding agreement, such as an annuity agreement. These contracts may be reinsured as an additional security. Alternatively, the guarantee may be supported by purchasing government bonds, corporate bonds, mortgage-backed securities, other financial contracts, other long term investment contracts or investment grade securities, including foreign counterparts of these instruments. In preferred embodiments of the invention, the guarantee is based on instruments that are A-rated or higher, preferably AA-rated or higher, and more preferably AAA-rated.

Accordingly, an investment allocation contract is based upon an up-front agreement to invest funds in a "guaranteed income instrument" or "guarantee instrument", and the guarantee is based on the performance of the vehicle chosen at the time of the commitment of funds. According to the invention, the guarantee instrument is not a reinsurance policy. However, the guaranteed instrument itself may be reinsured. However, the up-front agreement is between the investor and a fund of the invention. The guaranteed allocation is then made by the fund, pursuant to the investment agreement, and the fund purchases the underlying instrument. Accordingly, the fund can obtain preferred rates on individual instruments such as GICs. The investor may nonetheless choose one or more instruments that the fund purchases in order to regenerate the investment principal. For example the investor may chose a plurality of instruments, e.g. a combination of GICs and bonds, or GICs from different providers. According to the invention, the fund provides the investor with information concerning the guaranteed income instruments that are available, along with their rates and ratings. The amount of the initial investment that is allocated to the guaranteed component of the fund is a function of the instrument chosen, the investment period, the available rates, the need for periodic cash payments, and the fraction or multiple of principal that an investor seeks to have guaranteed over the investment period. In some embodiments, if multiple investors are seeking the same guarantee and are investing in an investment vehicle at the same time, the investment vehicle can combine the guaranteed fund allocations of all these investors and obtain a single guarantee instrument to guarantee their return of principal. In this embodiment, each investor still has a separate investment contract with the investment vehicle.

According to preferred embodiments of the invention, optional features include a periodic payment, or a partial or multiple guarantee of invested principal, or a combination thereof. A periodic cash payment may range in frequency from a daily payment to a single payment prior to the end of the guarantee period. However, preferred cash payments range from monthly payments to payments that are made every year or multiple thereof.

iv. An Up-front Agreement to Allocate Funds to a Managed Investment Program

According to the invention, an investment agreement provides that a portion of an investment will be allocated to a managed investment pool. A managed investment pool can include any form of appropriate investment, and the types of investment are related to the length of the investment period and the prevailing market conditions. According to the invention, an active or managed investment pool can include debt or equity investments in private companies, private equity funds, real estate, and other forms of investment, or a combination thereof. The managed investment pool can be managed by the fund. However, in a preferred embodiment, the managed investment pool is under the direction of a management company that is responsible for the fund as a whole. Accordingly, the investor does not have control over managed investment decisions. However, the fund may be tailored for particular investment needs/requirements, and the investment agreement may specify general categories of investments in the managed investment pool. For example, certain retirement funds have asset class and investment structure restrictions. For example, some state pension funds can only invest in real estate if the real estate is owned by the state.

According to the invention, returns on the managed or active investments may also be paid out periodically in order to provide flexibility to the fund.

According to preferred embodiments of the invention, investments in the active investment pool are allocated according to an ongoing allocation and reallocation procedure. Preferred investments include debt or equity investments in private companies and private equity funds and include sectors such as real estate and biotechnology.

According to preferred embodiments of the invention, optional features include a periodic cash payment of realized investment returns. Preferred cash payments range from monthly payments to payments that are made every year or multiple thereof.

B. Investment Allocation and Management

According to the invention, each investment vehicle or fund includes a guaranteed component and a managed investment component as discussed above. According to the invention, an investment in the fund is apportioned between these two components as a function of several factors, including the amount of principal guarantee that an investor is seeking, and current interest rates available for the guarantee instruments. In addition, each fund may be tailored to target specific investor needs, and the funds may be made available to investors in different formats. Examples of tailored managed funds include: mezzanine only funds, combination funds that blend the yields from multiple asset classes, and specialty asset classes such as a biomedical seed fund.

i. Allocations to the Guaranteed and Managed Components Within a Fund

Figure 4:
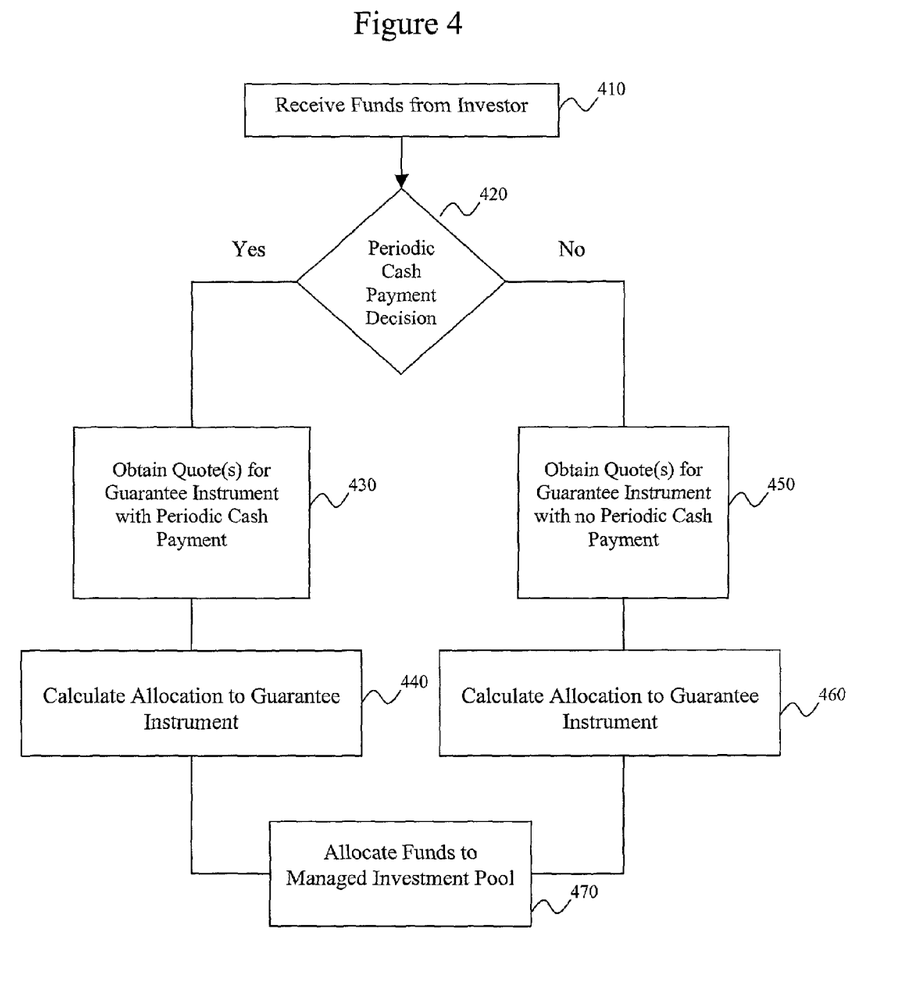
FIG. 4 shows a flowchart of an investment principal allocation system according to the invention.

FIG. 4 illustrates a preferred asset allocation procedure of the invention. Referring to FIG. 4, a principal is received from an investor (410), for example by wire transfer or certified check or other form of payment. If the investor wants a periodic cash payment (420), one or more interest rate quotes for guaranteed instruments are obtained and/or provided to the investor (430). The investor selects one or more of these instruments and the allocation of principal amount to the guarantee instrument(s) is calculated (440). The portion of principal that is allocated to the guarantee instrument(s) is a function of the investment period, the interest rates of the guarantee instrument(s), and the amount(s) of periodic cash payment. These parameters reflect the goals of the investors and the find managers. An investor may also choose to regenerate a fraction (e.g. 80%) of principal or a multiple (e.g. 120%) of principal. An example of such a calculation is shown in equation 1 below. Equation 1 represents a preferred embodiment where the guarantee instrument is a GIC and the guarantee period is n years. In this example, B shareholders are shareholders who have selected a periodic cash payment as part of their guaranteed investment. In the equation, the number of GIC B shares represents the amount of principal required for the guaranteed component relative to the total number of B shares for a particular investor, and the total number of B shares represents the total principal provided by the investor seeking periodic cash payments. The B shares can be shares of any dollar amount.

$$GIC\ B\ \text{Shares} = \left[\left(\sum_{j=1}^{n-1} \frac{i_B * \text{Total } B\ \text{Shares}}{(1+i_B)^j}\right) + \frac{\text{Total } B\ \text{Shares} * (1-(n-1)*i_B)}{(1+i_B)^n}\right] *$$

% principal guaranteed

Equation 1

Where $i_B$ is the interest rate for B shares that have a cash payment.

The amount required for principal regeneration determines the amount of money that can be allocated to the managed or active investment pool. Accordingly, the amount of principal that is allocated to the managed investment pool (470) is calculated according to Equation 2 below.

Total B Shares−GIC B Shares=Managed Fund B Shares       Equation 2

Similarly, if an investor does not want a periodic cash payment (420), one or more interest rate quotes for guaranteed instruments are obtained and/or provided to the investor (450). The investor selects one or more of these instruments and the allocation of principal amount to the guarantee instrument(s) is calculated (460). The portion of principal that is allocated to the guarantee instrument(s) is a function of the investment period and the interest rates of the guarantee instrument(s). These parameters reflect the goals of the investors and the fund managers. An investor may also choose to regenerate a fraction (e.g. 80%) of principal or a multiple (e.g. 120%) of principal. An example of such a calculation is shown in equation 3 below. Equation 3 represents a preferred embodiment where the guarantee instrument is a GIC and the guarantee period is n years. In this example, A shareholders are shareholders who have selected a guaranteed allocation without any periodic cash payment. In the equation, the number of GIC A shares represents the amount of principal required for the guaranteed component relative to the total number of A shares for a particular investor, and the total number of A shares represents the total principal provided by the investor who is not seeking a periodic cash payment. The A shares can be shares of any dollar amount.

$$GIC\ A\ Shares = \frac{Total\ A\ Shares}{(1+i_A)^n} *\%\ principal\ guaranteed \quad \text{Equation 3}$$

Where: $i_A$ is the interest rate for A shares that have no cash payment.

The amount required for principal regeneration determines the amount of money that can be allocated to the managed or active investment pool. Accordingly, the amount of principal that is allocated to the managed investment pool (470) is calculated according to Equation 4 below.

$$Total\ A\ Shares - GIC\ A\ Shares = Managed\ Funds\ A\ Shares \quad \text{Equation 4}$$

According to the invention, these equations provide a method for allocating a portion of an investment into a GIC based guarantee. However, one of ordinary skill in the art will understand that similar equations can be used to allocate funds to a guarantee based on other investment instruments and with different guarantee periods. Vehicles of the invention may include investors with different guaranteed principal percentages, different guarantee instruments, and different periodic cash payments. In some embodiments, an investor may have a guarantee period that is different, for example shorter, than the managed investment period. In further embodiments, an agreement of the invention may specify a guarantee allocation based on a series of guarantee instruments, each with a term that is shorter than the guarantee period of the investment vehicle, but that add up to the guarantee period when combined. For example, a rolling series of GICs can be used to span the guarantee period. This may be advantageous if the GIC rates are low at beginning of the investment period, but are expected to increase over time, for example after 6 months or a year.

Once an allocation to regenerate principal (or a percentage thereof) is made, the remainder of the original principal is allocated to the managed investment pool.

ii. Allocations Within the Managed Investment Pool of a Fund

The investments allocated to the managed investment pool are invested under the direction of a management team implementing a predetermined allocation scheme in accordance with the fund agreement. According to the invention, different investment vehicles have different allocation schemes. A managed allocation scheme may include one or more asset classes, and may focus on one or more investment sectors. Preferred asset classes include venture capital, private equity, and real estate. Preferred investment sectors include biomedical, energy, and private company investments.

Figure 5A:
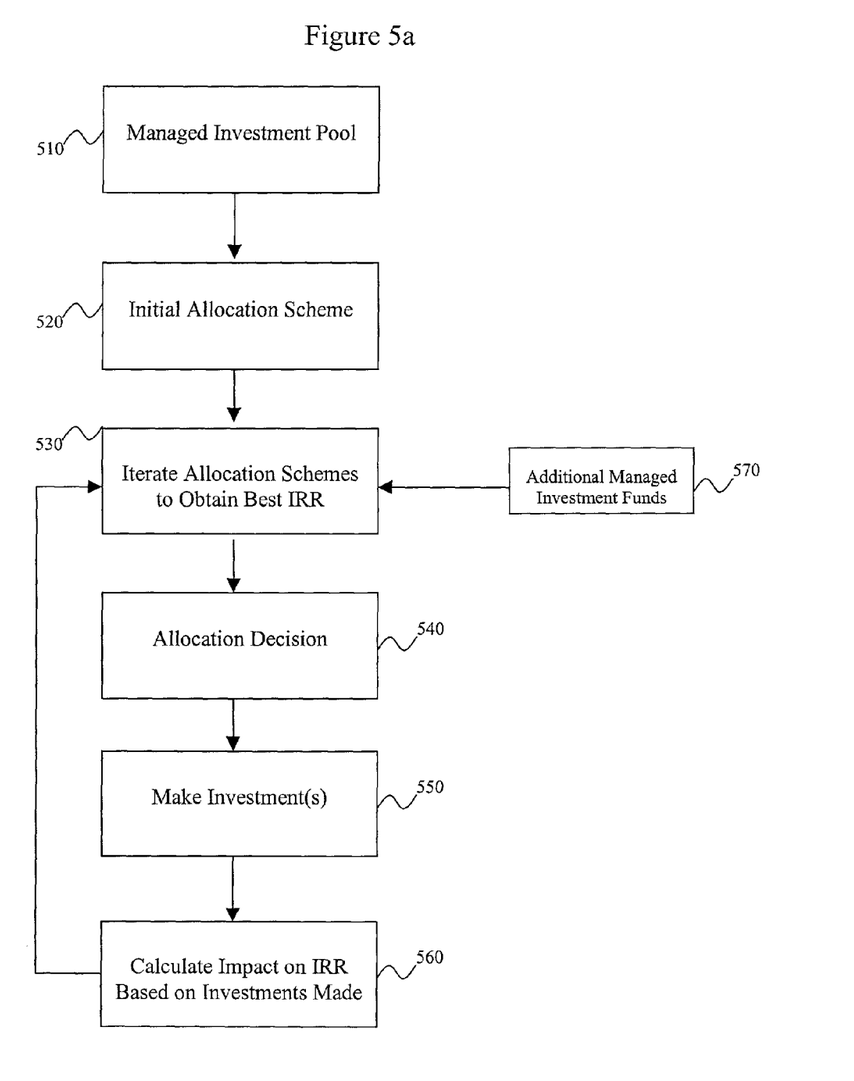
FIG. 5a shows an investment allocation flowchart within a managed investment component of an investment vehicle of the invention.

In preferred embodiments of the invention, the managed investment pool is allocated into a plurality of different sectors. According to the invention, the performance characteristics of different sectors are preferably minimally correlated. A preferred allocation procedure seeks to maximize the Internal Rate of Return (IRR) of the investment vehicle by optimizing initial allocations across the different sectors, and then optimizing reallocations across the different sectors based on the performance of existing investments and changes in economic conditions. An example of such an allocation procedure is shown in FIG. 5. Referring to FIG. 5*a*, a managed investment pool (510) is provided based on allocations from investors as described above. An initial allocation scheme (520) is established and a predicted IRR is calculated based on existing market conditions, including the types of investments that are available in the different sectors, the projected rates of return, the projected timing for return, the projected risk, the economic climate, specific market conditions surrounding the chosen asset class, and overall conditions in the IPO market that affect liquidity. The allocation percentages are then changed, and the predicted IRR is calculated for each allocation percentage in an iterative fashion (530). An allocation decision is made based on the best predicted IRR (540) and investments are made in the different sectors according to the chosen allocation distribution (550). Periodically, the impact of the existing investment(s) on the predicted IRR for the investment vehicle is calculated (560). This impact is related to the performance of the existing investments and is affected by changing market conditions. The updated information from 560 is used to reevaluate the overall allocation amongst the different sectors described above (530), and new allocation decisions (540) are made, thereby influencing subsequent investments (550). This procedure is repeated periodically over the life of the investment vehicle, preferably on a monthly basis, and may be performed on a computer. In addition, an allocation reevaluation (530) may be made if additional funds are added to the managed investment pool (570). This may occur during the marketing period of the investment vehicle when a new investor contributes funds, a portion of which are allocated to the managed investment pool. According to the invention, the predicted IRR of the investment vehicle includes returns from the managed investment pool in addition to the return of principal or a percentage thereof from the guaranteed component of the investment vehicle.

Figure 5B:
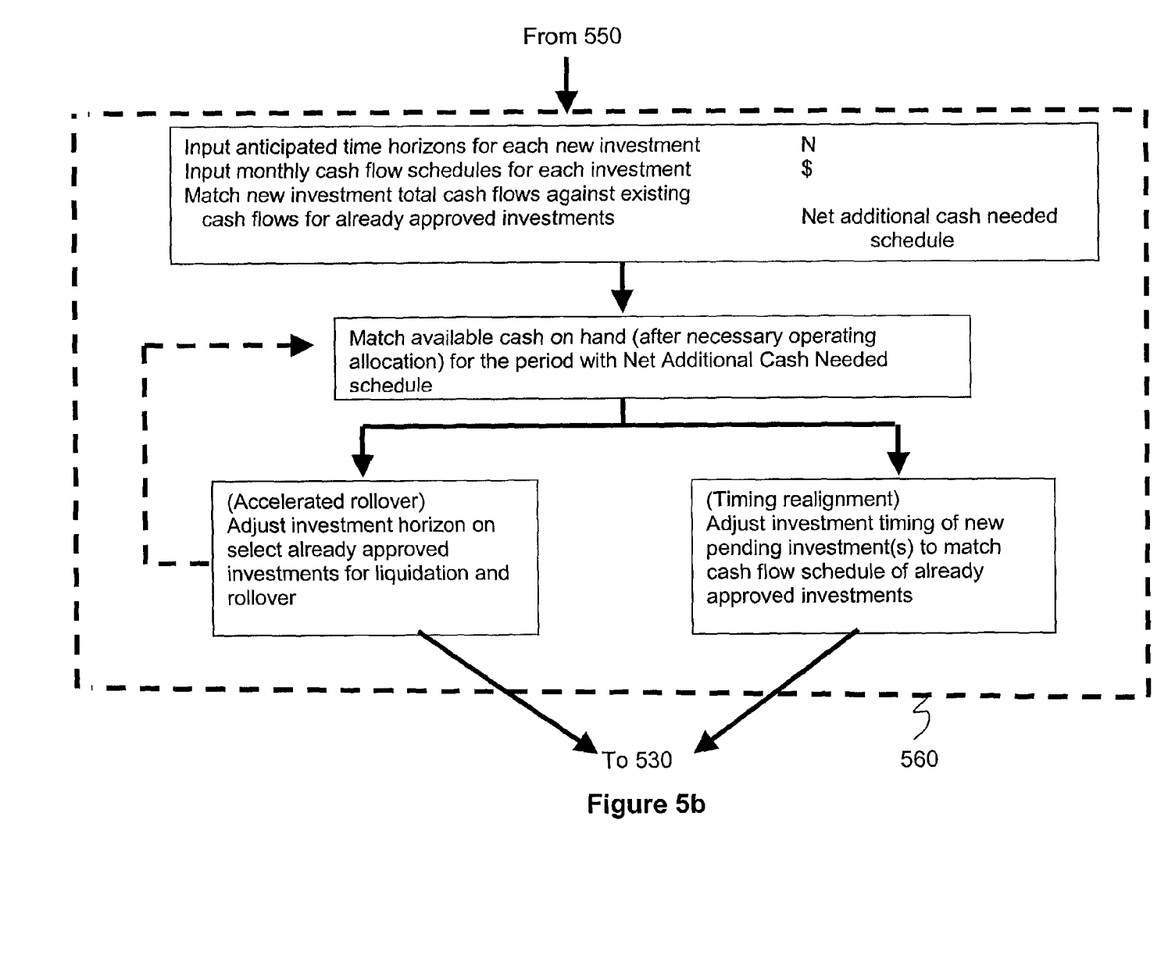
FIG. 5b shows a flowchart for calculating the effect on the predicted Internal Rate of Return (IRR) based on present investments.

FIG. 5*b* illustrates a preferred scheme for calculating the impact of existing investments on the predicted IRR of the investment vehicle. Factors that affect the periodic cash flow from existing investments include transaction fees, interest on loan components, equity participation, appreciation assumptions, investment horizons (periods) and the investment rollover rate. This is illustrated in FIG. 5*c* for different asset classes.

Figure 5C:
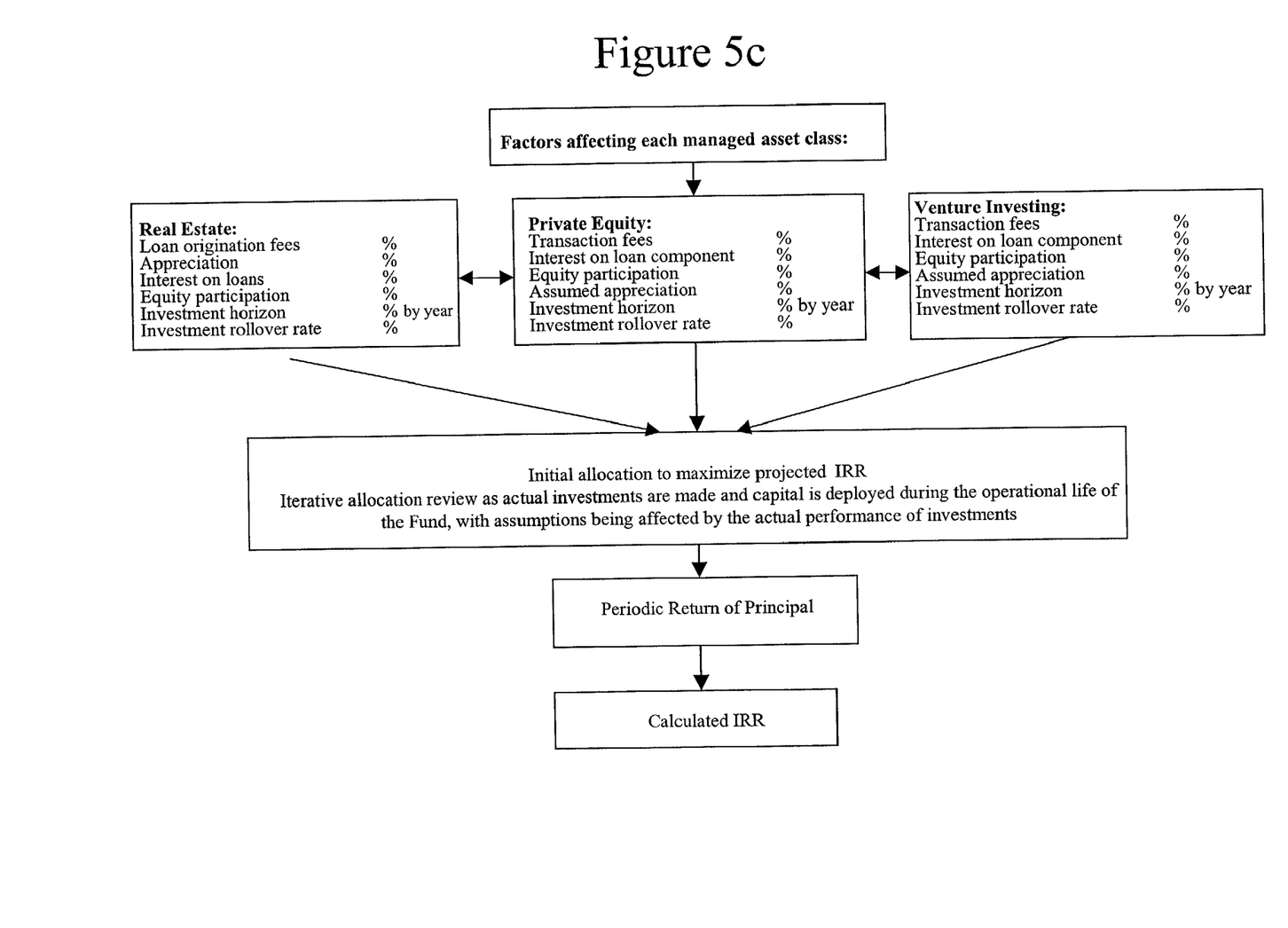
FIG. 5c shows an example of a managed pool allocation into three different asset classes.

FIG. 5*c* shows a preferred allocation scheme of the invention where the funds in the managed investment pool are allocated into real estate, private equity, and venture investing. According to the invention, other combinations of investment sectors may be chosen. A preferred combination includes sectors with different performance characteristics, and sectors with similar characteristics may be interchanged. For example, the real estate sector may be replaced with structured mezzanine financing in the private equity area, and other equity lending structures with a predictable or defined liquidity period.

In one embodiment of the invention, this allocation routine can be used to help an investor decide what type of investment allocations best suit the investor's goals. The allocation routine can be repeated using different starting parameters and an output that represents predicted allocations and returns is generated for each set of starting parameters. By reviewing the different output profiles, an investor can chose an appropriate set of starting parameters that will serve as predetermined values that form part of the investment agreement.

In other embodiments of the invention, the managed investment pool is invested in a single sector, or according to other parameters set forth in the fund agreement. Preferred sectors include biomedical, energy, private equity and other investments described herein.

iii. Other Factors that Affect Allocation Within the Managed Component of Investment Vehicles According to the Invention.

Multiple factors can be important in determining investment decisions, including investment sector or asset class allocations, within a managed investment pool. These factors include, the desired size of the fund, the percentage of investors requiring a periodic cash payment, payment periods, assumed marketing costs, management fees per period, management profit participation, interest rates for cash on hand, interest rates for the guaranteed instruments, and other factors that may be related to the specific investment sectors, as shown in FIG. 5c.

iv. Purchasing/packaging Options

According to the invention, preferred financial vehicles and methods can be made available to individual investors through structured investment products offered in conjunction with other financial institutions such as insurance companies, retail brokers, and others.

C System Applications

Methods of the invention can be implemented in whole or in part on computer systems as described herein. The invention provides algorithms for determining fund allocations according to the methods described herein. Flow charts illustrating preferred algorithms or methods of the invention are shown in FIGS. 4 and 5. These algorithms can be implemented in whole or in part on a computer system as described below.

Algorithms of the invention are particularly useful for modeling an expected investment result over a predetermined investment period, based on parameters chosen by the investor. Algorithms of the invention are also useful for managing the active investment pools of the invention. Investment outcomes can be electronically displayed, stored on a database, and accessed for subsequent use. According to preferred embodiments of the invention, information can be stored on a computer system with a memory, a processor, an input/output interface, and a removable data medium, all linked by a bus. The memory can be a RAM, ROM, CDROM, Tape, Disk, or other form of memory. The removable data medium can be a magnetic disk, a CDROM, a tape, an optical disk, or other form of removable data medium. Accordingly, fund and investor information is preferably stored in a memory in a computer system, or alternatively in a removable data medium such as a magnetic disk, a CDROM, a tape, or an optical disk. In a preferred embodiment, information is stored on a computer system including two or more networked computers. In a further embodiment, the input/output of the computer system can be attached to a network and information about the funds, including general investment models and investor-specific information, can be accessed and/or transmitted across the network. For example, information can be accessed and/transmitted on a web-based system using a web browser running on a workstation. According to preferred embodiments of the invention, methods for allocating investments, and/or forming investment funds according to the invention are implemented on a computer system, such as a computer system described above. Such a computer system may be a portable computer. In more preferred embodiments, the computer-based procedures include the step of receiving and or transmitting investments by wire-transfer.

In one aspect, the invention provides an electronic storage device that contains information relating to the funds of the invention. This information is useful for fund management. An electronic storage device may be a disk, a tape, or other storage medium. Useful information includes information relating to the structure of a fund, information relating to an investor's allocation between guaranteed and active investment pools, one or more computer programs useful to implement at least a portion of a method of the invention, or a combination of the above. Such information may be stored in the form of a database.

In another aspect, the computer-based systems are useful for marketing an investment vehicle of the invention. A routine can be run with different starting parameters to illustrate the range of performance characteristics of a fund. FIG. 6 shows a typical output that could be used in a marketing presentation. According to the invention, other outputs, including graphic outputs, can convey similar information relating to the performance characteristics of a given fund.

EXAMPLES

Example 1

In one embodiment, a fund called a private Lending Trust (the "PLT" or the "Fund") is specifically designed to provide a unique investment vehicle, establishing a new class of investment with clear fixed-income characteristics, but with a potential for higher yields. The initial Private Lending Trust is, in this embodiment, $2 billion in size with a term of 10 years. The size of the PLT allows pension fund trustees, institutional investors and high net-worth individuals and families to invest enough capital to have a positive effect on their overall portfolios. In this embodiment, the investment cannot be liquidated before its maturity. This term may be expanded to accommodate trailing investments. The Fund provides for two distinct classes of investors. The Class A shares are structured for those investors who are yield oriented and do not have a need for early return of principal. The Class B shares are designed to accommodate a periodic cash payment, tailored to the specific needs of the investors and paid over the 10-year term. In this embodiment, the PLT combines a guarantee of principal currently provided by an AA or better-rated insurance company with the investment skills of the management team. Approximately half of the assets of the PLT are used to guarantee principal, while the other half is invested or "equity lent" to companies and venture opportunities based upon stringent screening and evaluation criteria. It is important to note that the overall returns of the PLT are calculated based on the entire amount invested into the Fund.

The Investment Concept

The initial $2 billion of funds entrusted to the PLT are placed in two categories of investments (for illustrative purposes it has been assumed that the distribution of finds between the two categories is equal). Class A shareholders are those investors who receive a single payment of principal and investment returns at the closing of the Fund in year 10. Class B shareholders receive a payment at the closing of the Fund and are also provided a periodic cash payment throughout the life of the Fund. For the Class A shareholders, approximately half of their initial investment will be placed in a guaranteed instrument, for example a GIC provided by one or more insurance providers, which are AA rated or better The guaranteed instrument for the Class A shareholders will regenerate the initial investment principal at the end of the 10-year life of the Fund. For the Class B shareholders, slightly more than half of their initial investment will be placed into a second guaranteed instrument that will regenerate the principal invested through periodic cash payments and a payment at maturity. The remaining initial investment of both Class A and Class B shareholders is allocated among one or more strategically selected investment sectors including real estate, private equities and venture investments. These funds are actively invested and managed over the 10-year life of the Fund. An example in FIG. 6 shows an allocation of $2,000,000,000 into guaranteed and managed investments. As shown, based on the parameters indicated, $773,409,331 are allocated to managed investment. At the end of 10 years, the aggregate yield of the Fund is projected to be over $4.4 billion.

Distributions:

On an annual basis, a predetermined cash distribution amount may be specified and will be paid to the Class B shareholders. Then, for example, upon Fund maturity:

first, 100% to all shareholders in an amount equal to their initial principal contributions. For Class B shareholders this amount will be reduced by any principal returned as part of the annual distributions.

second, 100% of the profits to the shareholders and the management company pro-rata in accordance with their respective investment contributions to the managed investment pool and the Management Agreement.

Process:

Investors purchase interests in an investment vehicle, and preferably a limited liability company. This vehicle or company may be structured as a Master Trust. These interests specify the guarantee of principal, the targeted yield, and the life span of the investment vehicle. The life of the vehicle is determined at the time of its formation. The size of the amounts allocated for the guarantee of principal and investments vary based upon each investor's requirements.

The interests might in the future be registered as tradable securities.

Once the vehicle or company is formed and the guarantee is in place, management will use the available funds for investment to maximize the yield to the investor.

Example 2

Management Fees in a Typical Fund

The Fee Structure in a Typical Fund May be as Follows:

The commissions to be paid to investment bankers and financial intermediaries involved in obtaining investors for the Fund are calculated as a percentage (for example 1.25%) of the initial principal investment amount; this commission will be paid at the time of closing.

An annual management fee calculated as a percentage (for example 2%) of the amount invested will be paid to Management in full at the closing and annually thereafter.

With respect to Class A shareholders, a profit participation fee will be charged as specified by the terms of the particular Fund upon maturity of the Fund.

With respect to Class B shareholders (with coupon payments), a profit participation fee will be charged as specified by the terms of the particular Fund. The profit participation fees may be different for Class A and Class B shareholders.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

INCORPORATION BY REFERENCE

All patents, patent applications, and scientific publications mentioned herein above are incorporated by reference into this application in their entirety.

I claim:

1. A computer-implemented method for each of a plurality of investors to participate in a managed investment pool provided by an investment vehicle while retaining an investor-specified guarantee of principal over the life of the investment vehicle, the method comprising:
   a) for each of a plurality of investors, inputting to a computer system information comprising:
      a predetermined investment period corresponding to the life of the investment vehicle,
      an investor-specified investment principal,
      an investor-specified percentage of principal to be regenerated by a predetermined interest rate by the end of the predetermined investment period,
      an optional investor-specified periodic payment,
   b) inputting to the computer system a fixed interest rate available at the time of an investment and calculating, on a processor of the computer system, a first portion of the investment principal of each investor to be allocated to a guaranteed investment pool at the fixed interest rate for the duration of the investment period, wherein the first portion is calculated to be sufficient to regenerate the investor-specified percentage of principal by the end of the predetermined investment period, and wherein for each investor the first portion is less than the entire investor-specified investment principal such that a second portion remains for investment in a managed investment pool;
   c) inputting to the computer system a selection of one or more asset classes for the second portion of the investment principal of each investor that is allocated to the managed investment pool;
   d) calculating, on a processor of the computer system, a projected rate of return for each investor based on i) the percentage of principal that is to be regenerated from the first portion of the investment principal, and ii) the projected rate of return of the managed investment of the second portion of the investment principal;
   e) providing an optional output of the projected rate of return calculated in d); and,
   f) storing, in the computer system memory, information relating to the predetermined investment period and, for each investor, the investor-specified parameters of a), the fixed interest rate of the guaranteed investment pool, the first portion of the investment principal calculated in step b) for allocation to the guaranteed investment pool, and the second portion of the investment principal that is allocated to the managed investment pool.

2. The method of claim 1, wherein the first portion is sufficient to regenerate 100% of the investment principal by the end of the investment period.

3. The method of claim 1, wherein the first portion is allocated to an instrument selected from the group consisting of a GIC, a treasury note, and a zero coupon bond.

4. The method of claim 1, wherein the first portion is allocated to an instrument that backed by at least one financial instrument selected from an A rated security, or above, a mortgage backed security, a corporate bond, a municipal bond, a U.S. Treasury bond or note, an index tied to U.S. bonds and notes, a GNMA, a FNMA, a Guaranteed Insurance Contract of 3 to 15 years, a collateralized mortgage obligation, a LIBOR-based investment of 5 to 15 year maturity, a financial guarantee insurance, a funding agreement, an annuity contract, a zero-coupon bond, and foreign equivalents thereof.

5. The method of claim 4, wherein the financial instrument is provided free of a sales commission.

6. The method of claim 1, wherein the managed investment comprises at least one of an investment in a private company, private equity, real estate, and venture capital.

7. The method of claim 1, wherein the managed investment comprises an investment in at least one class of investment selected from the group consisting of biotechnology, pharmaceutical, medical device, energy, and telecommunication investments, and publicly traded securities.

8. A computer system for allocating fixed amounts of principal for each of a plurality of investors into different investment pools for the duration of a predetermined investment period provided by an investment vehicle, the system comprising:
  a) at least one input interface for inputting, for each of a plurality of investors, information comprising:
    a predetermined investment period corresponding to the life of the investment vehicle
    an investor-specified investment principal,
    an investor-specified percentage of principal to be regenerated by a predetermined interest rate by the end of the predetermined investment period,
    an optional investor-specified periodic payment,
    a fixed interest rate that is available at the time of an investment, and
    a selection of one or more asset classes that are available at the time of an investment;
  b) at least one processor configured for calculating:
    a first portion of the investment principal of each investor to be allocated to a guaranteed investment pool at the fixed interest rate for the duration of the investment period, wherein the first portion is calculated to be sufficient to regenerate the investor-specified percentage of principal by the end of the predetermined investment period, and wherein for each investor the first portion is less than the entire investor-specified investment principal such that a second portion remains for investment in a managed investment pool comprising the selection of one or more asset classes, and
    a projected rate of return for each investor based on i) the percentage of principal that is to be regenerated from the first portion of the investment principal, and ii) the projected rate of return of the managed investment of the second portion of the investment principal; and
  c) at least one memory for storing information relating to the predetermined investment period and, for each investor, one or more of the investor-specified parameters, fixed interest rate, and asset classes of a).

* * * * *